US007568167B2

(12) United States Patent
Van Dok et al.

(10) Patent No.: US 7,568,167 B2
(45) Date of Patent: Jul. 28, 2009

(54) NON-PERSISTENT USER INTERFACE FOR REAL-TIME COMMUNICATION

(75) Inventors: Cornelis K. Van Dok, Bellevue, WA (US); Richard M. Banks, Egham (GB); Sean O. Blagsvedt, Seattle, WA (US); Hillel Cooperman, Sammamish, WA (US); Tjeerd S. Hoek, Kirkland, WA (US); Mark R. Ligameri, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 10/606,494

(22) Filed: Jun. 26, 2003

(65) Prior Publication Data

US 2004/0268263 A1 Dec. 30, 2004

(51) Int. Cl.
*G06F 3/048* (2006.01)

(52) U.S. Cl. ....................... 715/789; 715/788; 715/753; 709/204; 709/206

(58) Field of Classification Search ......... 715/784-787, 715/817-830, 788-789, 758, 753, 751; 709/203-207
See application file for complete search history.

(56) References Cited

U.S. PATENT DOCUMENTS

| | | | | | |
|---|---|---|---|---|---|
| 5,377,317 | A | * | 12/1994 | Bates et al. | 715/789 |
| 5,390,295 | A | * | 2/1995 | Bates et al. | 715/789 |
| 5,617,526 | A | * | 4/1997 | Oran et al. | 715/779 |
| 5,699,535 | A | * | 12/1997 | Amro | 715/800 |
| 5,715,415 | A | * | 2/1998 | Dazey et al. | 715/708 |
| 5,793,365 | A | * | 8/1998 | Tang et al. | 715/758 |
| 5,852,440 | A | * | 12/1998 | Grossman et al. | 715/811 |
| 5,898,431 | A | | 4/1999 | Webster et al. | 345/331 |
| 6,025,841 | A | * | 2/2000 | Finkelstein et al. | 715/803 |
| 6,052,121 | A | | 4/2000 | Webster et al. | 345/329 |
| 6,147,773 | A | * | 11/2000 | Taylor et al. | 358/400 |
| 6,310,632 | B1 | | 10/2001 | Monroe et al. | 345/808 |
| 6,342,908 | B1 | * | 1/2002 | Bates et al. | 715/798 |
| 6,353,448 | B1 | * | 3/2002 | Scarborough et al. | 715/744 |

(Continued)

OTHER PUBLICATIONS

Smith, Marc; Cadiz, JJ; and Burkhalter, Byron; "Conversation Trees and Threaded Chats,"; ACM 2000 Conference on Computer Supported Cooperative Work (CSCW2000); Dec. 2-6, 2000; p. 97-105.

(Continued)

*Primary Examiner*—Ba Huynh
*Assistant Examiner*—Eric Wiener
(74) *Attorney, Agent, or Firm*—Workman Nydegger

(57) ABSTRACT

Methods, systems, and computer program products for making real-time communication user interfaces less intrusive by automatically adjusting the user interfaces based on the user's level of interaction. An initial representation of a user interface for real-time communication is displayed and automatically adapted to the user's activity level based on user input directed to the user interface. For example, the initial representation may be automatically adjusted, either reduced or enlarged, to an intermediate representation, a larger representation, or a smaller representation. When a representation is reduced, a message may be displayed to indicate the reduced representation's location. For smaller representations, subsequently received real-time messages may be displayed adjacent to the smaller representation, at least for a predetermined time. The initial representation may display in a desktop bar that displays other user interfaces, such as for a calendar, etc. As the initial representation adjusts, these other representations may adjust as well.

46 Claims, 10 Drawing Sheets

U.S. PATENT DOCUMENTS

| | | | | |
|---|---|---|---|---|
| 6,396,487 | B1 | 5/2002 | Jameson | 345/342 |
| 6,396,521 | B1 * | 5/2002 | Lai et al. | 715/800 |
| 6,411,312 | B1 | 6/2002 | Sheppard | 345/769 |
| 6,512,529 | B1 * | 1/2003 | Janssen et al. | 715/790 |
| 6,646,673 | B2 * | 11/2003 | Caviedes et al. | 348/14.07 |
| 6,670,970 | B1 * | 12/2003 | Bonura et al. | 715/768 |
| 6,865,599 | B2 * | 3/2005 | Zhang | 709/218 |
| 6,865,719 | B1 * | 3/2005 | Nicholas, III | 715/856 |
| 7,020,849 | B1 * | 3/2006 | Chen | 715/864 |
| 7,124,372 | B2 * | 10/2006 | Brin | 715/751 |
| 7,146,573 | B2 * | 12/2006 | Brown et al. | 715/802 |
| 7,185,057 | B2 * | 2/2007 | Brown et al. | 709/206 |
| 7,441,200 | B2 * | 10/2008 | Savage | 715/762 |
| 2001/0047626 | A1 * | 12/2001 | Ohkado | 49/506 |
| 2002/0028018 | A1 * | 3/2002 | Hawkins et al. | 382/187 |
| 2002/0089546 | A1 * | 7/2002 | Kanevsky et al. | 345/800 |
| 2003/0001899 | A1 * | 1/2003 | Partanen et al. | 345/800 |
| 2003/0063120 | A1 * | 4/2003 | Wong et al. | 345/746 |
| 2003/0105812 | A1 * | 6/2003 | Flowers et al. | 709/203 |
| 2003/0142139 | A1 * | 7/2003 | Brown et al. | 345/800 |
| 2003/0233650 | A1 * | 12/2003 | Zaner et al. | 725/32 |
| 2004/0103156 | A1 * | 5/2004 | Quillen et al. | 709/206 |
| 2004/0133638 | A1 * | 7/2004 | Doss et al. | 709/203 |
| 2004/0183829 | A1 * | 9/2004 | Kontny et al. | 345/751 |

OTHER PUBLICATIONS

Whitfield, Nigel; "Instant Messaging,"; Personal Computer World; <www.pcu.co.uk>; Aug. 2002; p. 135-152.

* cited by examiner

NON-PERSISTENT USER INTERFACE FOR REAL-TIME COMMUNICATION

BACKGROUND OF THE INVENTION

1. The Field of the Invention

The present invention relates to methods, systems and computer program products for real-time communication interfaces.

2. The Relevant Technology

The popularity of the Internet and satellite-based technologies has enhanced the way people communicate with each other by allowing users quick and easy access to a virtually endless sea of communication methods. Any given person may now contact another person with greater or lesser immediacy using various media that include accessing the World Wide Web, electronic mail (email), satellite-based or Internet-based telephony, video conferencing, and instant text messaging. These methods allow people to stay in touch with each other, and to access information on a variety of subjects, in some cases instantly.

Currently, instant text messaging (IM) is one of the more popular forms of relatively immediate or real-time communication. Such real-time communication allows a user to communicate with another user within a matter of seconds. In operation, real-time communication interfaces typically display a selectable contact list. When a user desires to communicate with a contact in real-time, the user may select a contact from the contact list and send real-time text communications to the user. In so doing, the user's message usually is received by the contact within a second or two of being sent. This ability to communicate with other contacts in such a short time highlights a number of advantages instant text messaging has over other types of electronic messaging, such as email.

Real-time communication users converse with other contacts typically using a separate conversation interface for each contact (i.e., one-on-one session), or one conversation interface for multiple contacts (i.e., chat session). Messages appear in each conversation interface in time-dependant alternating segments. Thus, users can monitor continuous text conversations through one conversation interface, even after multiple iterations of sending and receiving responses. This ability allows for a fluid real-time conversation between users. Thus, real-time communication provides many conveniences compared with other messaging protocols such as electronic mail.

Despite such conveniences, FIG. 1 illustrates some significant impediments that remain with present real-time communication interfaces. As shown, a prior art monitor 100 with a desktop screen 102 may display application icons 104, and several other open application interfaces. Such applications may include several different real-time communication applications 110, 120, and 130, an email application 140, and a word processing application 150. The monitor 100 may also display one or more incoming message notifications, e.g., notifications 160 and 170. These applications and notifications illustrate a significant problem in the prior art: intrusive notices and interfaces.

For example, incoming message notification 170 obstructs email interface 140, which itself obstructs word processing application 150. Email interface 140 and real-time communication interface 120 both obstruct real-time communication interface 130. Instant messenger interface 110 and incoming message notification 160 simply occupy currently unused desktop screen real estate. As a result, for a user to monitor the real-time communication conversations 110, 120, and 130, as well as to reference the word processing document 150 or email 140, the user must toggle between each of the different interfaces. In addition to obstructing other interfaces, notification 170 requires explicit user interaction in order to dismiss the notification so that the user can proceed with other, potentially more pressing tasks. Notification 160 automatically fades from view after a predetermined amount of time, giving the user a limited amount of time to take any desired action.

Although notifications 160 and 170 may display part of a received real-time message, neither notification represents a user interface for real-time communication. Note, for example, that notifications 160 and 170 do not include a text input box or other input field for composing real-time messages. If a user decides to participate in a real-time conversation by interacting with notifications 160 and 170, a separate user interface, such as user interfaces 110, 120, or 130, is launched. Once launched, user interfaces 110, 120, and 130 remain a fixed (maximized) size, regardless of the amount of user interaction with each user interface. For example, user interface 120 displays as shown until explicitly resized, moved, closed, or minimized by a user.

A user may attempt to remedy the screen space and multiple interface issues by arranging or resizing the various application interfaces. In addition, the user may simply turn off incoming message notifications 160 and 170 in order to avoid distractions. While most present GUI-based operating systems provide this ability to arrange various interfaces selectively, having to explicitly interact with multiple user interfaces can be burdensome. Accordingly, methods, systems, and computer program products that make real-time communication user interfaces less intrusive by automatically adjusting the user interfaces based on a user's level of interaction are desired.

BRIEF SUMMARY OF THE INVENTION

The present invention relates to making user interfaces for real-time communication less intrusive by automatically adjusting the user interfaces based on the user's level of interaction. In accordance with example embodiments, an initial representation of a user interface for real-time communication is displayed and user input directed to the initial representation is monitored. The initial representation of the user interface is automatically adapted to the user's activity level based on the monitored user input. For example, the initial representation may be automatically adapted to an intermediate representation that includes a text input box, a larger representation that also includes the text input box, or a smaller representation. Because each contains a text input box, both the intermediate representation and the enlarged or larger representation can receive user input. Automatically adapting occurs without explicit user input to reduce or enlarge the initial representation, such as an explicit minimize, maximize, or resize input.

In an example embodiment, the initial representation is enlarged in response to hovering over or clicking on the initial representation. The initial representation may be reduced in response to a user sending a real-time message. For example, the user may compose a real-time message in the text input box of a larger representation of the user interface. Then, after the user sends the real-time message, the larger representation may be reduced automatically to the intermediate representation.

When the intermediate representation is reduced to the smaller representation, a message may be displayed to indicate the location of the smaller representation, which after reduction may be simply an icon. Subsequent real-time messages may be displayed next to the smaller representation, at least for a predetermined time, as they are received. Interacting with the displayed real-time messages for the smaller representation may cause the smaller representation to be enlarged to either an intermediate representation or the larger representation.

The initial representation of the user interface for real-time communication may be displayed in a desktop bar that also displays representations of other user interfaces, such as for a calendar, streaming audio or video, a contact list which allows custom identification information to be associated with individual contacts, etc. A user may initiate a real-time message to a contact by selecting the contact's representation, or dragging a computerized object, such as a file icon, and dropping the computerized object on the contact. As the initial representation is adapted, these other representations may be adapted as well. For example, as the initial representation enlarges, representations of one or more other user interfaces may be reduced. Similarly, as the initial representation reduces, the representations of the other user interfaces may be enlarged.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates to simplifying user interaction with real time communication user interfaces by adapting the user interfaces to the user's activity level. Example embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communication connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 2A:
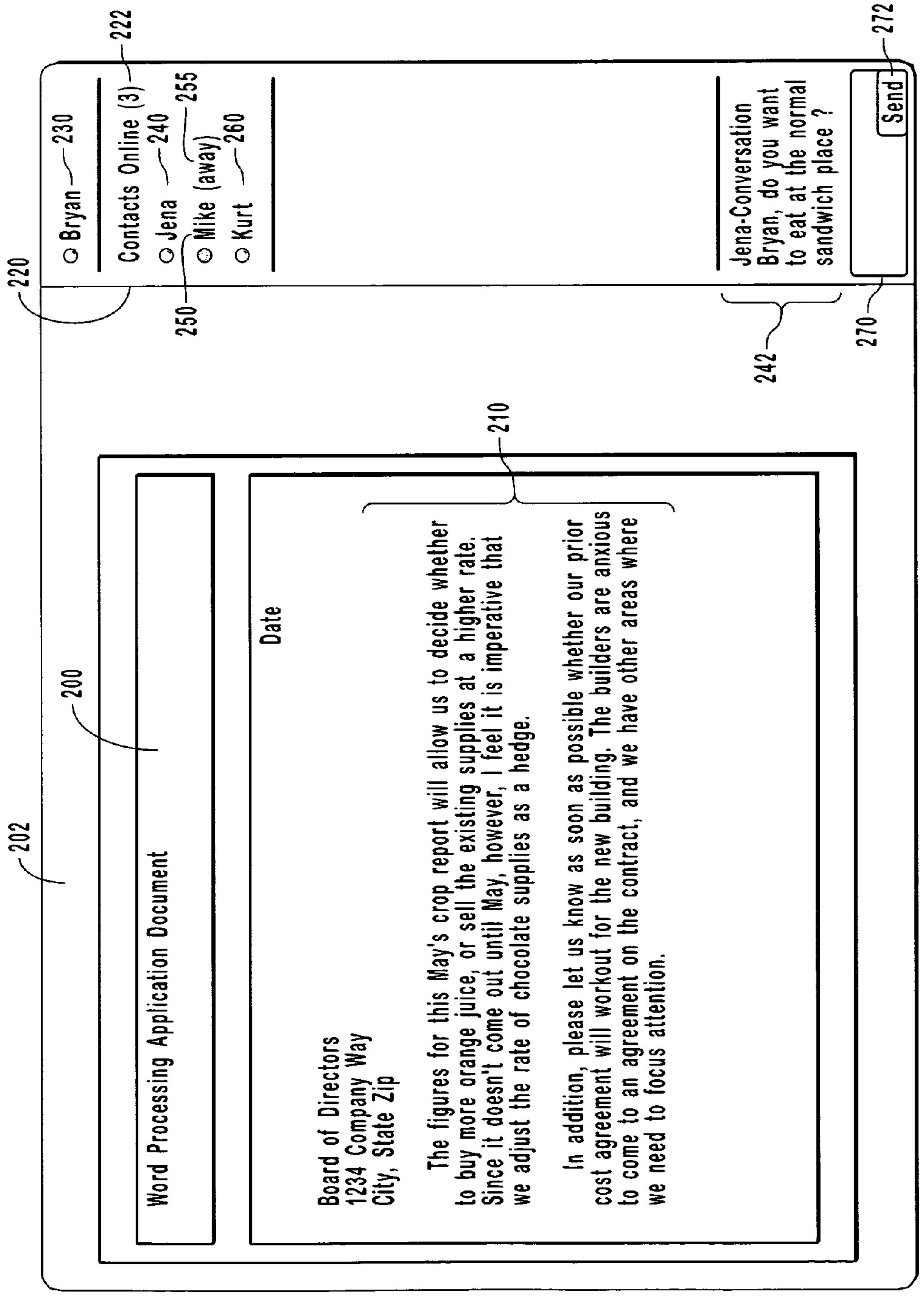
FIG. 2A illustrates an example embodiment of the present invention in connection with a word processing application.

FIG. 2A illustrates an example embodiment of the present invention in connection with a word processing application. Here the figure depicts a computer screen or desktop 202 with a user typing a letter 210 into word processing document 200, which appears next to a desktop bar 220. Although FIG. 2A shows desktop bar 220 at the right side of screen 202, it should be appreciated that desktop bar 220 may be displayed in any portion of the screen 202 (side, top or bottom, etc.).

Desktop bar 220 (for FIGS. 2A and 2B) displays a user interface for a contact list that includes representations of the user, Bryan 230, and of contacts Jena 240, Mike 250, and Kurt 260. Each contact is represented by a name and a bullet point, such as with contact Jena 240. FIG. 2A shows the user's (Bryan 230) representation prominently above the other contacts, though such a placement is not required. An online count 222 indicates how many of the contacts are online. Other status information, including status information for individual contacts, also may be shown. For example, the contact representation for Mike 250 indicates that he is online, but has not interacted with a real-time communication interface (or some other type of measurement such as typing on his keyboard) for a predetermined period of time or has otherwise indicated that he is unavailable for real-time communication. Consequently, the contact representation for Mike 250 shows an altered bullet point and text 255 indicating he is "away" from his messaging device (i.e., computer, PDA, etc.).

Desktop bar 220 (in FIGS. 2A and 2B) also displays representations of a user interface for real-time communication (e.g., chat, instant messaging, etc.) that includes message text 242, a text input box 270, and a send option 272. For this example embodiment, the user interface representation shown in FIG. 2A illustrates an intermediate representation of a user interface for real-time communication in a minimized state. As described in greater detail below, minimized does not necessarily mean the smallest possible state, but rather, an intermediate state that allows for user interaction with the intermediate representation with a minimal level of intrusion by the user interface. Compare this intermediate user interface representation, for example, with the smaller user interface representation 327 shown in FIG. 3A and the larger user interface representations 270 and 311 shown in FIGS. 2B (After), 3B and 3C.

Note, however, that intermediate, larger or enlarged, and smaller or reduced, are relative terms. Each qualifier should be evaluated relative to other representations of user interfaces for real-time communication. Also note that while minimized ordinarily refers to an icon and/or text representation of a currently running application or process, in the context of this application, minimized and minimized state also can be used to reference an intermediate representation of a user interface displayed in a desktop bar. In other words, minimizing a real-time communication user interface may be used to display the user interface in desktop bar 220, rather than displaying the user interface as merely an icon and/or text.

Figure 1:
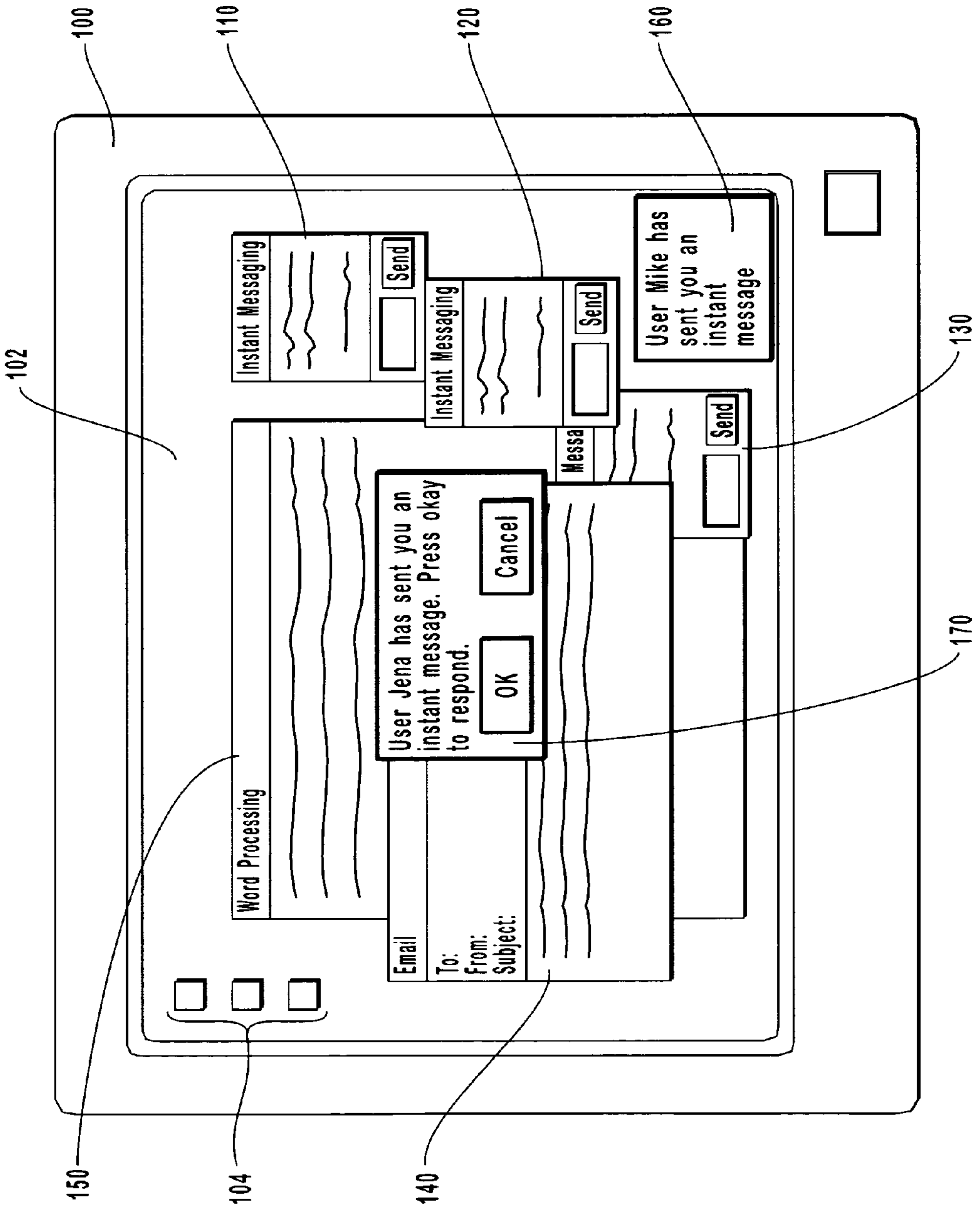
FIG. 1 (PRIOR ART)
FIG. 1 illustrates a prior art depiction of a computer screen having several applications open, including a plurality of real-time communication applications.

FIG. 2A illustrates that user Bryan 230 is involved in a conversation with at least one other contact, Jena 240. As shown, user Bryan 230 receives a real-time message 242 which appears below the list of contact representations, and within the desktop bar 220. Thus, unlike FIG. 1, the example real-time communication interface for real-time communication that is illustrated in FIG. 2A does not obstruct the word processing document 200. User Bryan 230 can monitor incoming real-time messages, such as message 242, as they are received, and as described below, may respond via a text input box 270 and send option 272 without opening a new real-time communication user interface.

Figure 2B:
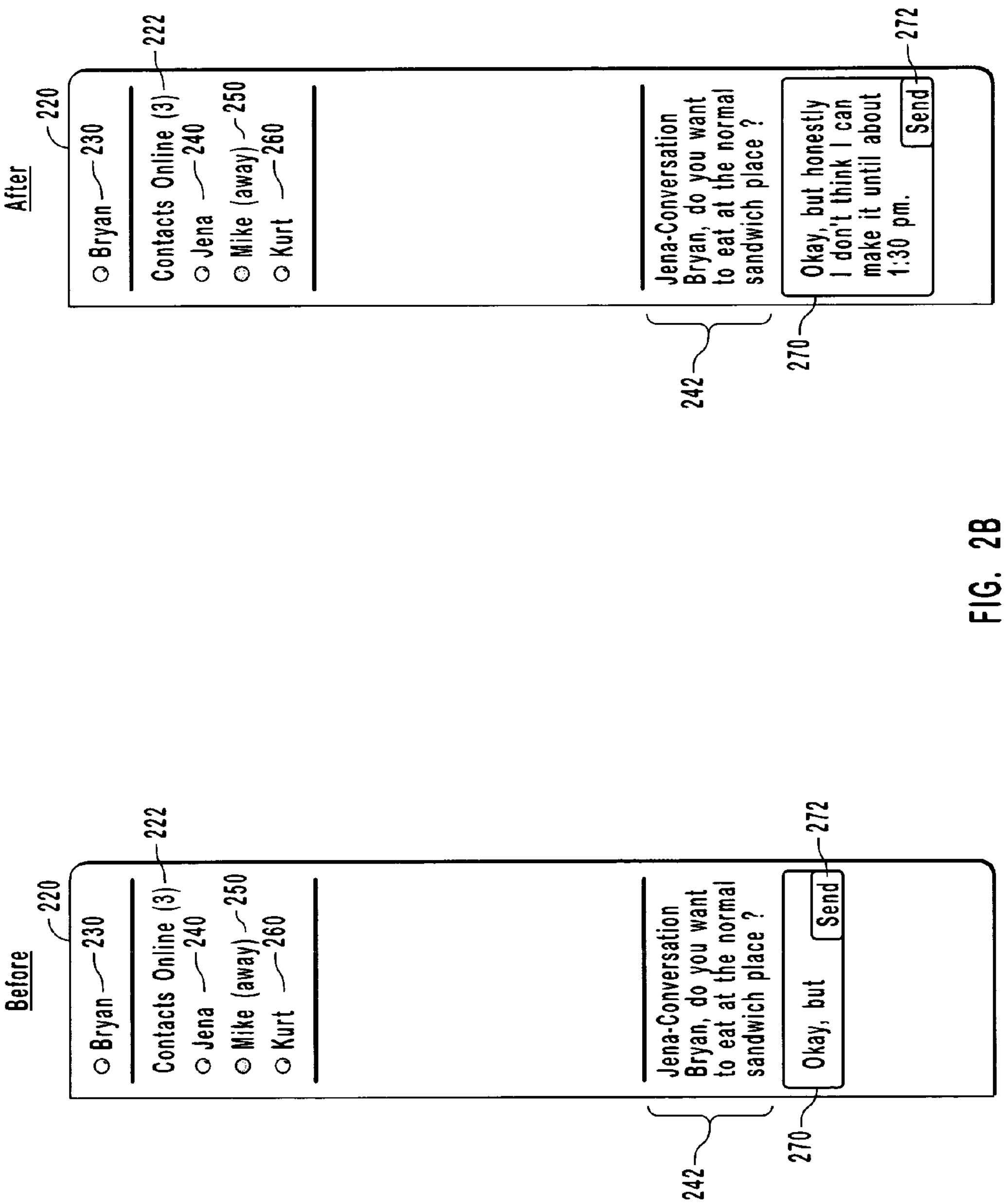
FIG. 2B illustrates the example embodiment shown in FIG. 2A as a before and after sequence.

FIG. 2B illustrates before and after sequences of user Bryan 230 entering a real-time message in text input box 270. In the "Before" sequence, user Bryan 230 begins entering text in text input box 270. User Bryan's text, however, needs more space than is allotted in the "Before" depiction. Accordingly, the text input box 270 automatically enlarges or grows in the "After" depiction to allow user Bryan 230 more space for entering his response text. In other words, user Bryan does not need to explicitly resize the real-time communication user interface. Since the text input box 270 begins at a more minimal size ("Before"), and automatically enlarges or grows to fit the entire typed text ("After"), user Bryan 230 does not need scroll bars to see his entire real-time message.

The "After" representation of text input box 270 is an example of an enlarged or larger representation of a user interface for real-time communication. After user Bryan 230 sends his message, at least a portion of the text will appear under Jena's 240 message as part of a conversation history; and text input box 270 reduces or shrink back to its initial size. Among other things, automatically adjusting or adapting the text input box 270 of the real-time communication interface based on user interaction allows for a compact user interface layout that initially favors other applications, but gives way to an enlarged or larger user interface when the user's interaction with the real-time communication interface make an enlarged or larger user interface appropriate. This ability to automatically adjust a user interface based on a user's interaction with the user interface, as opposed to explicit resize, maximize or minimize input, represents a significant advancement, particularly in the context of real-time communication, where real-time messages may interrupt other activities.

Figure 3A:
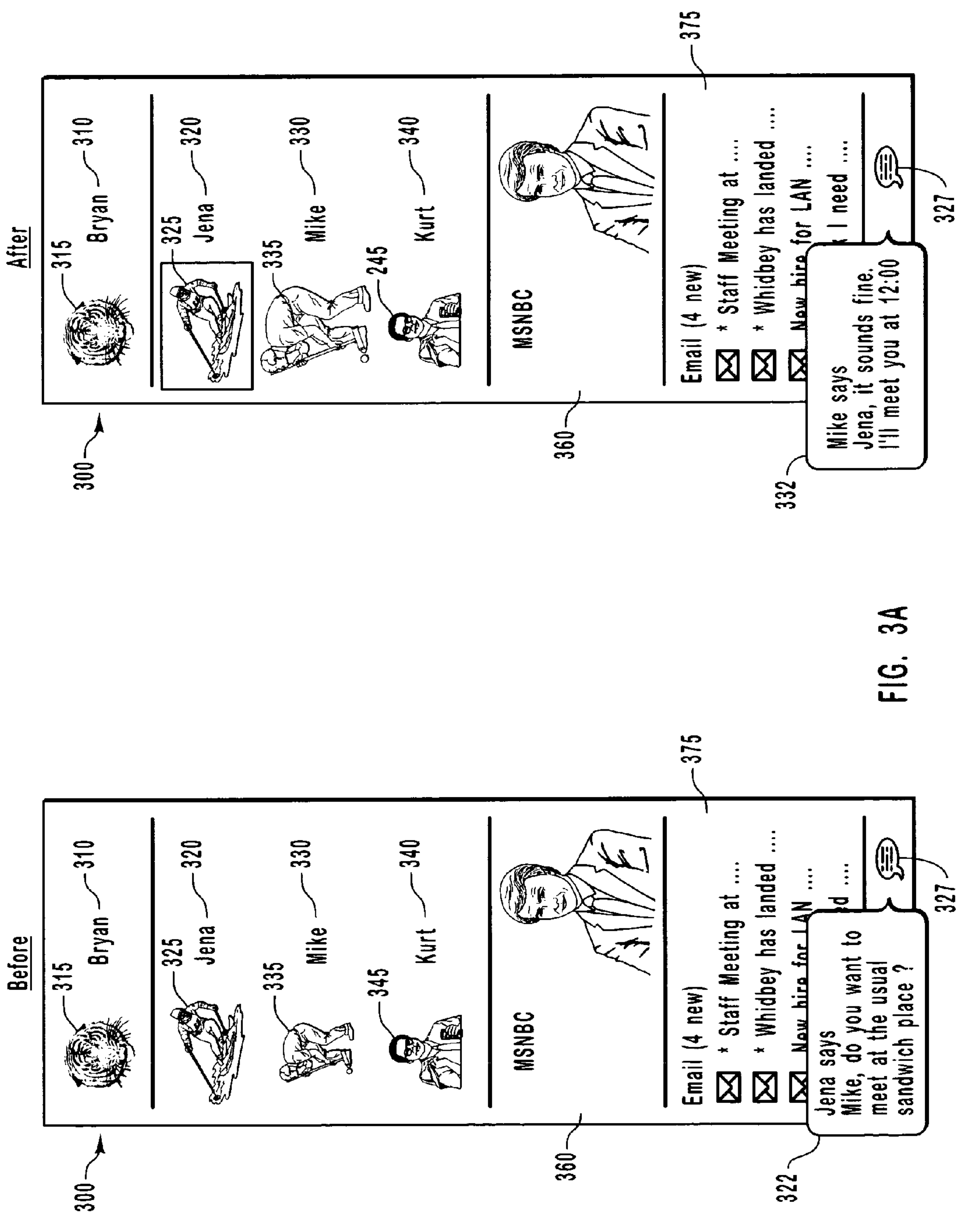
FIG. 3A illustrates a before and after sequence for an example real-time communication user interface in accordance with the present invention.

FIG. 3A depicts additional example embodiments of the present invention in "Before" and "After" sequences of desktop bar 300. Desktop bar 300 displays a representation of a user Bryan 310 and a contact list that includes contacts Jena 320, Mike 330, and Kurt 340. Each contact has an associated user-definable icon or graphic 315, 325, 335, and 345. In FIG. 3A, user Bryan 310 is monitoring a real-time conversation between contacts Jena 320 and Mike 330.

Because user Bryan 310 is monitoring (that is not actively participating and therefore having little or no interaction with) the real-time conversation between Jena 320 and Mike 330, the user interface for the real-time communication is a reduced or smaller representation 327. The reduced or small representation 327 allows other user interfaces, such as video newscast 360, list of incoming emails 375, the word processing application of FIG. 2A, etc., more space. The reduced or smaller representation 327 comprises an icon in the form of a balloon or conversation balloon, below newscast 360 and email list 375.

Smaller or reduced user interface representations for real-time communication may take a variety of forms. Furthermore, the user may be offered one or more dynamic options based on whether a user hovers (e.g., places a cursor over the balloon) or selects the balloon (e.g., "clicks" on the balloon). Such dynamic options could include displaying a portion of the message, displaying an option to explicitly maximize the conversation window, an option to view the conversation history, an option to cancel the conversation session, etc. Of course, the invention is not limited to any of these examples.

Continuing with the "Before" sequence, Jena 320 sends Mike 330 a text message 322. This message notification 322 for user Bryan may remain only for a predetermined time period. For example, if user Bryan 310 fails to interact with the message notification 322, the message fades, and therefore is not shown in the "After" representation of desktop bar 300. Interaction may comprise, e.g., "hovering" over the message, or selecting the message, as described with the conversation balloons above. After the message notification 322 fades, the sending contact's representation 325 in the "After" sequence may be highlighted, alerting user Bryan 310 to a received message. Here, for example icon 325 ("After") is shown outlined, representing that Jena 320 has sent a real-time message that has not been viewed, selected, etc. by user Bryan 310. One will appreciate that this sort highlighting may comprise a wide variety of methods such as bolding or outlining a representation, blinking a representation, inserting smaller textual notices near the representation, enlarging the representation, etc. Contact Mike 330 responds to contact Jena's message 322, as shown in the FIG. 3A "After" sequence. Here too, the real-time communication interface places message 332 beside or adjacent to conversation representation 327.

Figure 3C:
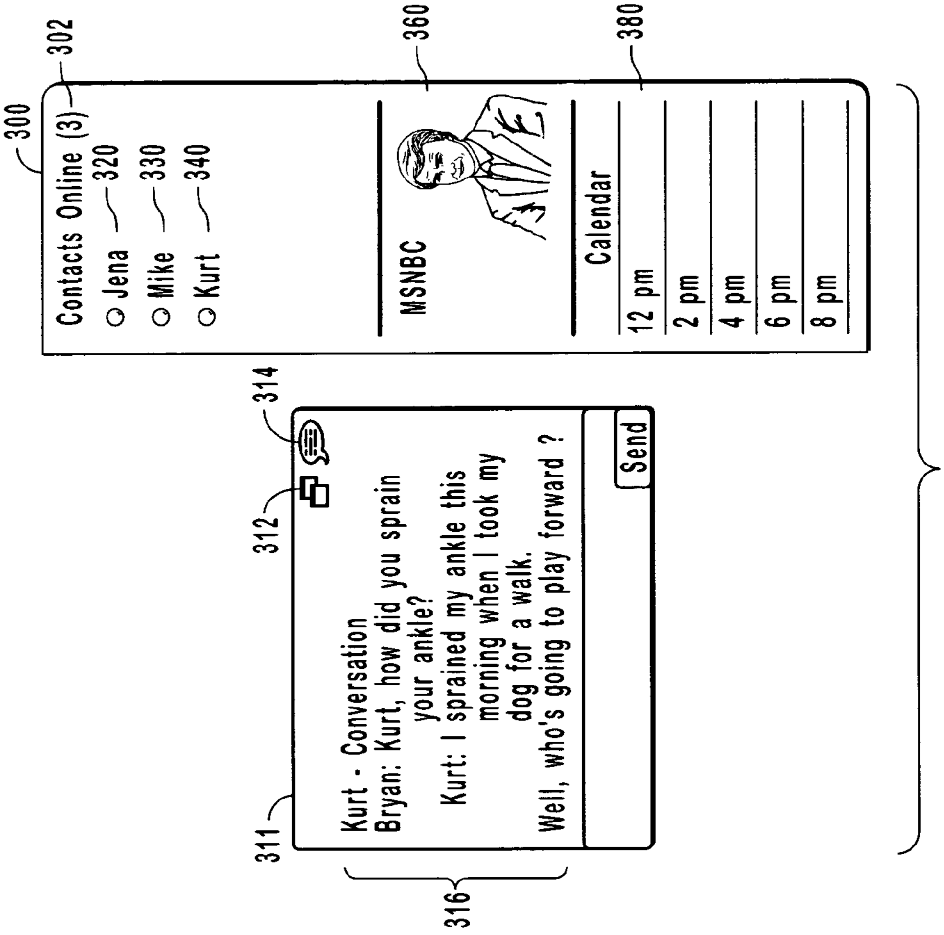
FIGS. 3B-3C illustrate example embodiments of a user interface for real-time communication in accordance with the present invention.
Figure 3B:
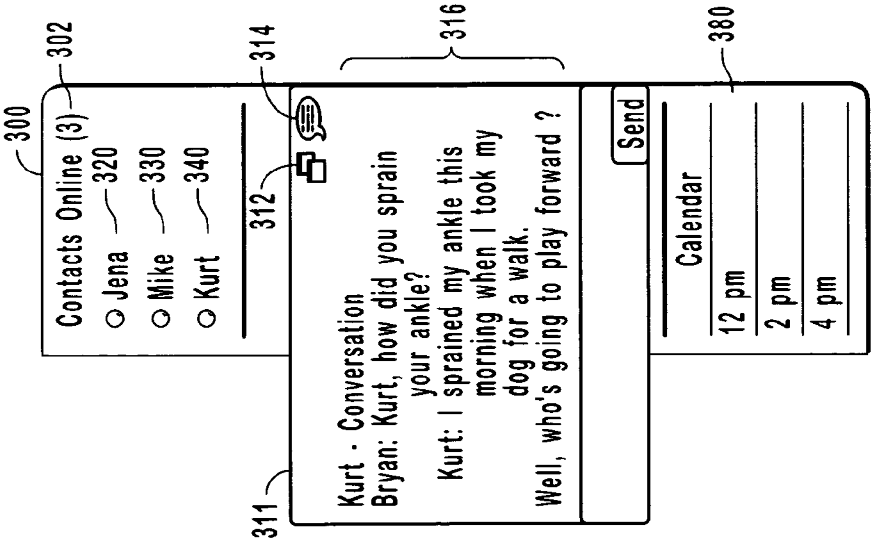

FIGS. 3B and 3C illustrate additional embodiments of a larger or enlarged real-time communication user interface 311, which is maximized. In FIGS. 3B and 3C, the desktop bar 300 does not show the client's user name (e.g., Bryan 310, FIG. 3A). FIGS. 3B and 3C do, however, show an online count 302, as described above in FIGS. 2A-2B. As well, FIG. 3B shows a different user interface 380 for a calendar, rather than the email inbox 375 shown in FIG. 3A.

In FIG. 3B, the user interface or conversation window 311 is shown prominently on the desktop bar 300. Note that the user interface 311 in this case is slightly larger than the overall desktop bar 300, and includes conversation text 316, as well as additional window options 312 and 314. An enlarged conversation window 311 is appropriate here because the user is actively interacting with the real-time conversation, rather than simply monitoring. That is, since the user is directing his attention to the real-time 311 in this manner does not obstruct other interfaces with which the user might be otherwise interacting. The user also may explicitly direct that the message window 310 remain in an enhanced size, even though the user directs his attention elsewhere.

Continuing with FIG. 3B, the user interface 311 may present the typed text 316 such that the conversation lines appear in different horizontal offsets. Different horizontal offsets provide a visual cue regarding the identity of the participants. After a time, the user interface 311 may drop the contact names preceding the text after a time, and simply show the conversation in contact-specific horizontal offsets to identify the source of each real-time message. However, it should be recognized that there are a variety of ways the conversation window 311 may present the message text 316 to the user.

The user interface 311 may include the two window options 312 and 314 as shown, as well as additional options (not shown), and may provide the user with a variety of menu options. For example, option 312 may provide an option to display a conversation history, or may provide an option to remove the conversation window upon selection (e.g., "clicking") to make the conversation window appear as a separated interface (e.g., FIG. 3C). Upon a user's selection of option 314, time and date properties may be displayed, etc. Window option 314 may provide similar options as window option 312, or may provide a minimize function such that selection of the option 314 drops the conversation window into an iconic form (e.g., message balloon icon 327, FIG. 3A) of docks the conversation window within desktop bar 300.

FIG. 3C shows the case when the user selects the conversation window 311 to be separated from the desktop bar 300. FIG. 3C, also shows that, as a result, another user interface, e.g., newscast 360, may appear where the real-time communication user interface 311 resided previously. Newscast user interface 360 may automatically replace user interface 311 when the conversation window 311 is separated from the overall interface. Alternatively, desktop bar 300 may show a blank spot where the user can optionally insert the newscast user interface 360 some other user interface.

In addition, these various, optional user interfaces may enlarge or reduce based on adjustments made existing conversation window 311. For example, in FIG. 3B, calendar object 380 is shown below real-time communication user interface 311 with three two-hour blocks. When the user interface 311 is removed or reduced in some way (e.g., FIG. 3C), the calendar 380 may automatically enlarge as shown in FIG. 3C, to show a five two-hour blocks or to display more information. Accordingly, the various user interfaces, such as newscast 360 (streaming video), streaming audio (not shown), calendar 380, and email object 375 may automatically adjust or adapt based on the real-time communication user interface, or may be adjusted manually by the user as is common in graphical user interfaces.

Figure 4:
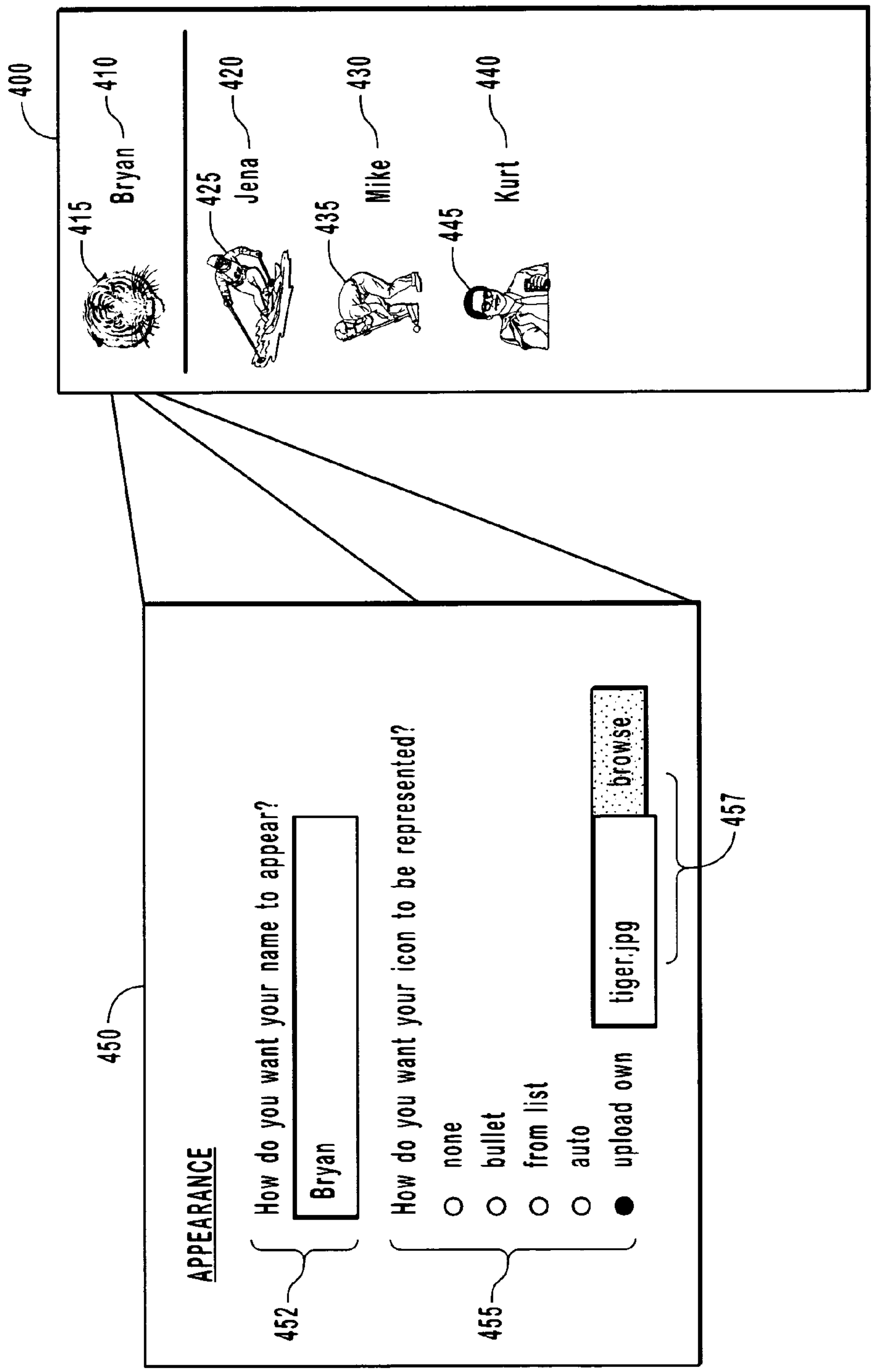
FIG. 4 illustrates an example of how a user may manipulate the user's representation within the present invention.

FIG. 4 shows one embodiment of how a user may alter or customize his representation of others in a contacts interface for real-time communication. The figure depicts a contact interface 400 with user Bryan 410, contacts 420, 430, and 440 and respective iconic representations 415, 425, 435, and 445. FIG. 4 also depicts a modification user interface 450 with a textual appearance option 452 and an image or graphic appearance option 455, including a custom image selection option 457.

In practice, a user, e.g. user Bryan 410, may change the user's appearance to other contacts, e.g. 420, 430, 440, by typing a user name in the text input option 452. To do so, the application software, may present a user, e.g. user Bryan 410, with several options 455 including using (or altering) a default icon, or selecting a custom image. It should be appreciated, however, that customized text, icons, and graphics are merely examples of manipulating a user's representation of others.

Figure 5:
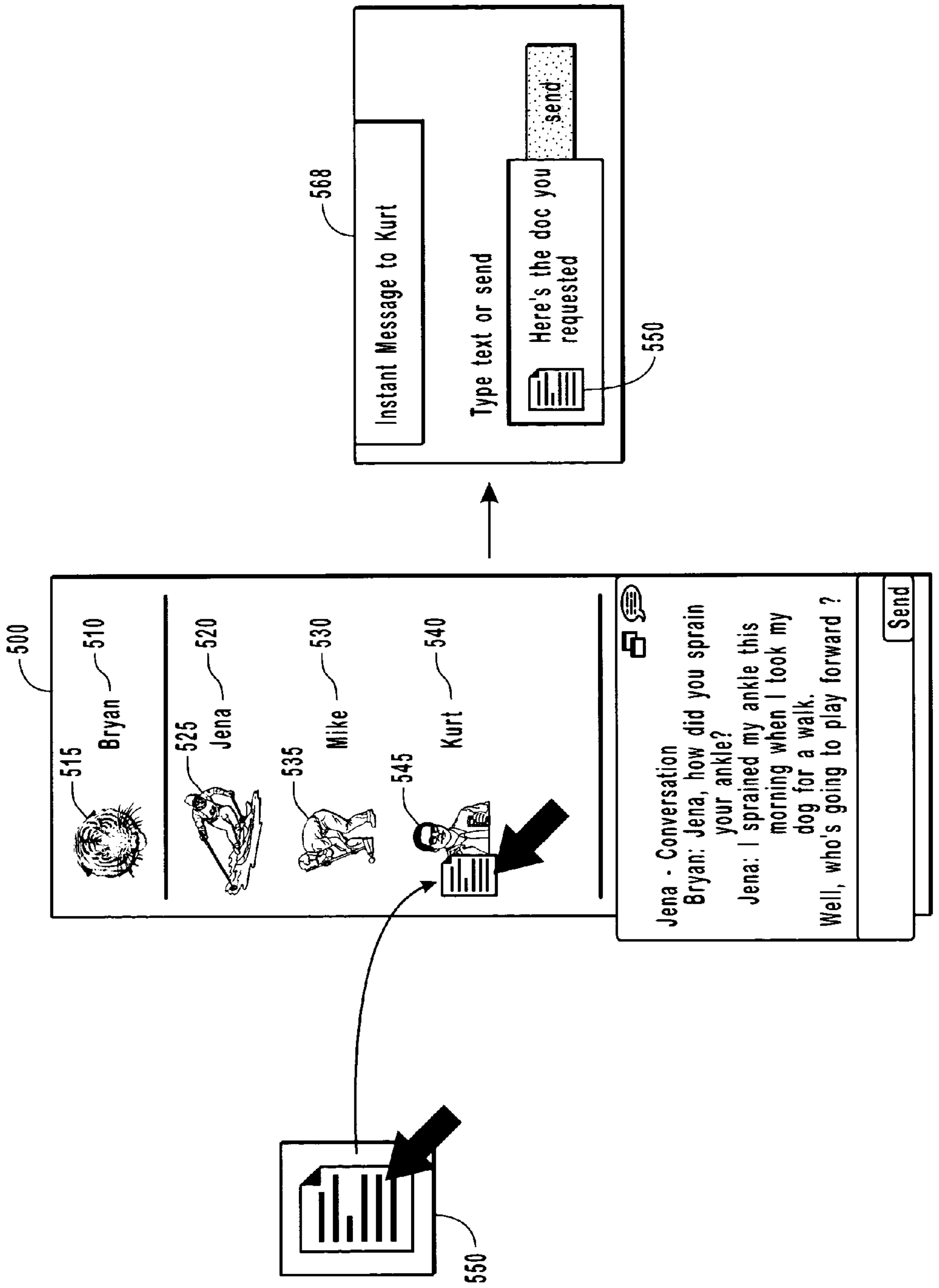
FIG. 5 illustrates a drag-and-drop operation using an example real-time communication interface in accordance with the present invention.

FIG. 5 illustrates at least one method by which a user, e.g. user Bryan 510 may initiate a real-time communication with another user, using a typical "drag and drop" method. "Drag and drop" is a phrase referring to selecting and moving objects (and, in some cases executing files or commands) with a cursor in a graphical user interface. FIG. 5 depicts a desktop bar 500 for user Bryan 510, with a contact list comprising contacts Jena 520, Mike 530, and Kurt 540. Each user or contact has a respective graphical or iconic representation 515, 525, 535, and 545. The figure depicts user Bryan 510 sending a real-time communication to Kurt 540 by "dragging and dropping" a file 550 onto Kurt's 540 representation 545. Of course, Bryan 510 may initiate the message by dropping the file onto Kurt's name. Either way, this action initiates a new real-time message window 568 that comprises the document 550 and an option to send accompanying text, or alternatively may add a file icon in the send portion of an existing real-time communication user interface such that a new message window 568 is not opened.

Figure 6:
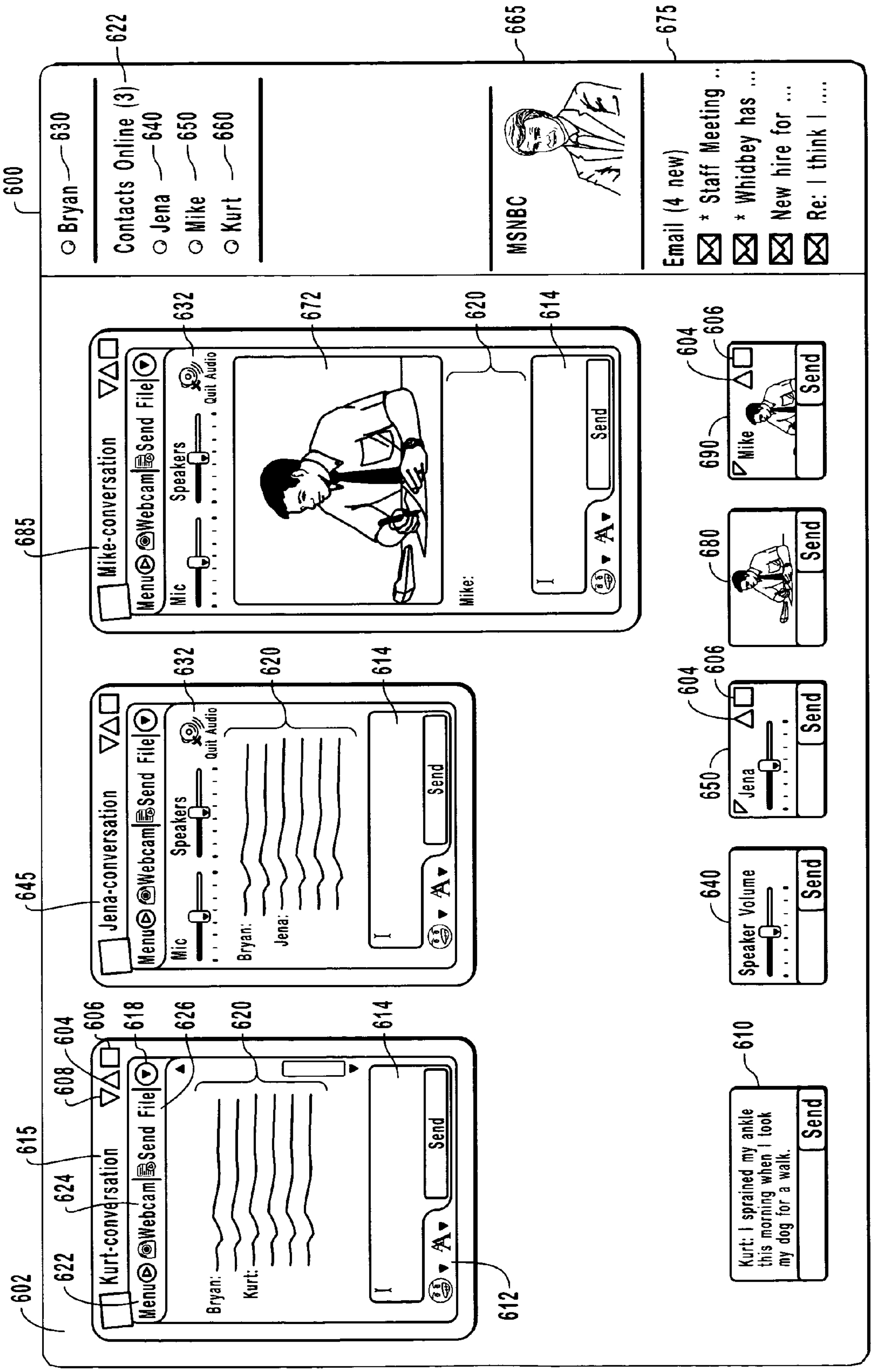
FIG. 6 shows one or more example embodiments of the present invention for a multi-media environment.

FIG. 6 illustrates a variety of embodiments of the present invention in the context of multi-media such as audio and/or video messaging. As described in more detail below, desktop 602 includes three enlarged user interface representations 615 (text only), 645 (audio), and 685 (video), along with reduced user interface representations 610, 640 or 650, and 680 or 690 that each appear below their corresponding enlarged user interface representation. In accordance with the present invention, the example real-time communication interfaces illustrated in FIG. 6 are capable of automatically adapting to the user's activity level based on monitored user input to help make the user interface less intrusive. Of course, a user also may switch between the enlarged and reduced representations with explicit input, such as a maximize input, a minimize input, etc. Note that each of the enlarged and reduced representations alternatively may be displayed within desktop bar 600. Similar FIGS. 2A-2B, desktop bar 600 shows an online count indicator 622, user Bryan 630, and a list of contacts including Jena 640, Mike 650, and Kurt 660. Since the real-time message user interface is separated from the desktop bar 600, newscast user interface 665 and email user interface 675 fill the remaining space.

Each of the enlarged user interface representations 615, 645, and 685 show examples of some options and capabilities that a real-time communication user interfaces may provide. For clarity, however, most common options are numbered, and will be described, only with respect to user interface representation 615. User interface representation 615 includes a window minimize button 608, a window maximize button 604, a window close button 606, and an interface minimize button 618. For enlarged user interface representation 615, 645, and 685, the window minimize button 608 may serve to reduce the conversation window to corresponding conversation windows 610, 640 or 650, and 680 or 690; the window maximize button 604 may serve to enlarge the conversation windows to a larger size if they have been previously reduced or resized or may display the conversation history; and the window exit button 606 may serve to close the conversation entirely. The interface minimize button 618 may be designed to perform the same function as window minimize button 608, or may dock conversation windows 615, 645, and 685 to the desktop bar 600.

Conversation window 615 also includes a menu button 622 that may provide a list of additional interface options, a webcam button 624 that may provide an option for audio messaging (e.g., conversation window 645) or video messaging (e.g., conversation window 685), and a send file button 626 for adding a file to a real-time message. A format and emoticon toolbar 612, a text entry box 614, and at least a portion of the ongoing text conversation 620 show toward the bottom of conversation window 615.

For an audio conversation, e.g. audio conversation window 645, the real-time communication user interface may provide additional audio controls 632 to adjust the volume, speakers, or quit the audio conversation. The audio conversation window 645 shows that audio and text chat may be combined into a single interface, and may be reduced into alternative audio user interfaces, e.g., window 640 or window 650, which may represent minimized representations of conversation window 645. Conversation windows 640 and 650 merely illustrate one example of the extent to which optional controls may be included in a reduced audio conversation window 645. Note that audio conversation window 650 also includes a window minimize button 604 and a window maximize button 606.

Similar to audio conversation window 645, video conversation window 685 provides audio controls 632 to adjust the volume, speakers, or quit the audio portion of the real-time video messaging communication. Video conversation window 685 includes video stream 672, shows a text entry box 614 and an ongoing text conversation history 620 for combined real-time text and video messages. As in the case of the other conversation windows 615 and 645, a user may reduce the video conversation window 685 into smaller user interfaces, e.g. video conversations windows 680 and 690. Like smaller audio conversation windows 640 and 650, smaller video conversation windows 680 and 690 illustrate merely one example of the extent to which optional controls may be included in a reduced video conversation window 685. Note that video conversation window 690 also includes window minimize and maximize buttons 604 and 606.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non functional acts may be described or claimed in a particular order, the present invention is not necessarily limited to any particular ordering or combination of acts and/or steps.

Figure 7:
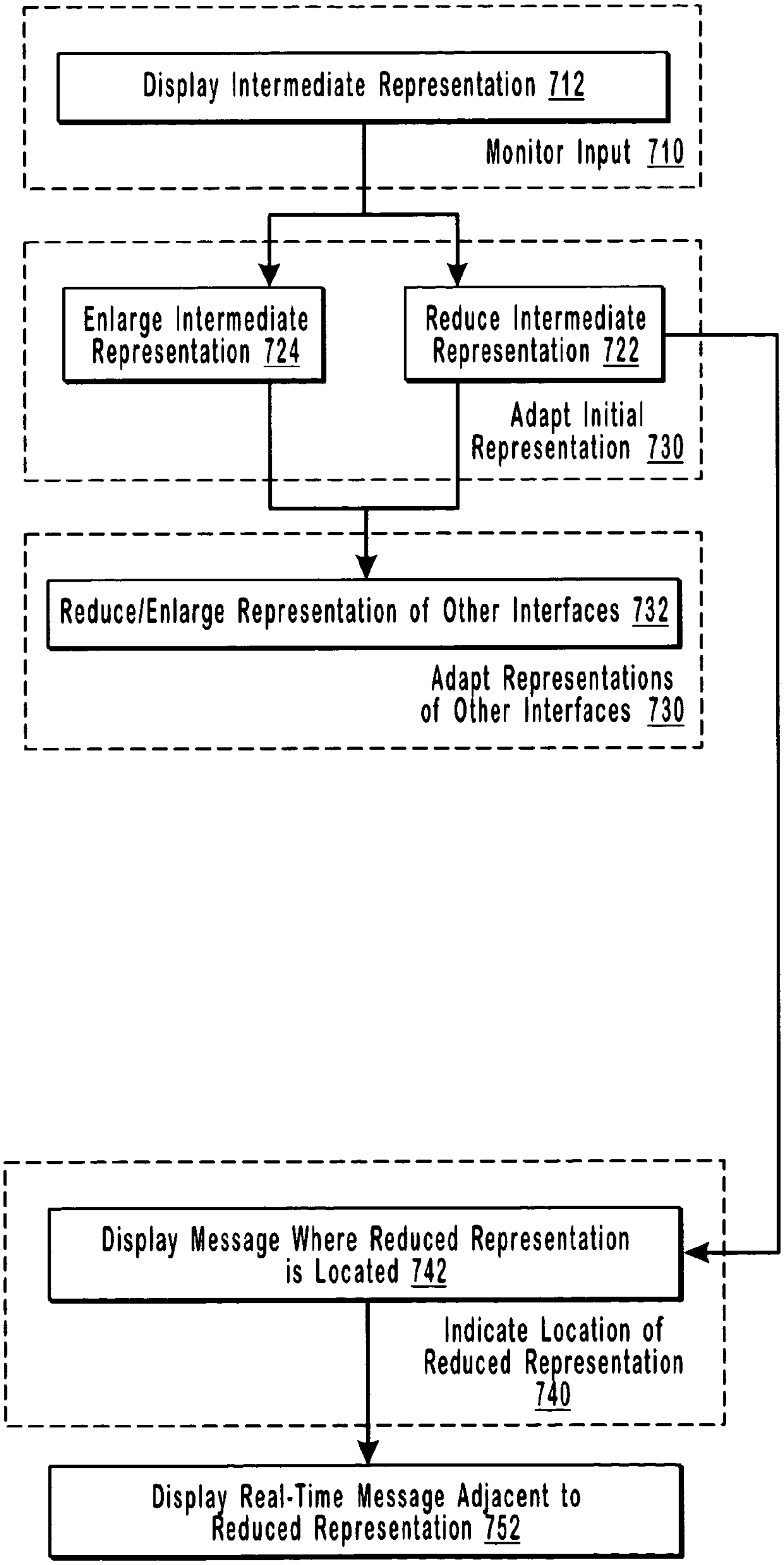
FIG. 7 illustrates example non-functional acts and functional steps for methods of making user interfaces for real-time communication less intrusive in accordance with the present invention.

FIG. 7 shows example acts and steps for methods of making one or more user interfaces for real time communication less intrusive by automatically adjusting the one or more user interfaces based on the user's level of interaction in accordance with the present invention. A step for monitoring (710) user input directed to an initial representation of a user interface for real-time communication may include an act of displaying (712) an intermediate representation of the user interface that includes a text input box and at least a portion of a received real-time message. A step for automatically adapting (730) the initial representation of the user interface to the user's activity level based on the monitored input may include an act of automatically enlarging (724) an intermediate representation of the user interface upon receiving an increased level of interaction with the intermediate representation and an act of automatically reducing (722) the intermediate representation of the user interface upon receiving a decreased level of interaction with the intermediate representation.

A step for automatically adapting (730) one or more other user interfaces to account for size changes in the initial representation of the user interface may include an act of automatically reducing or enlarging (732) the one or more other user interfaces when the initial representation is enlarged or reduced. When a user interface representation is reduced, a step for indicating (740) the location of the reduced representation may include an act of displaying (742) a message that indicates where the reduced representation is located. For reduced user interface representations, such as a user interface that has been reduced to an icon, received real-time messages may be displayed (752) adjacent to the reduced representation.

Figure 8:
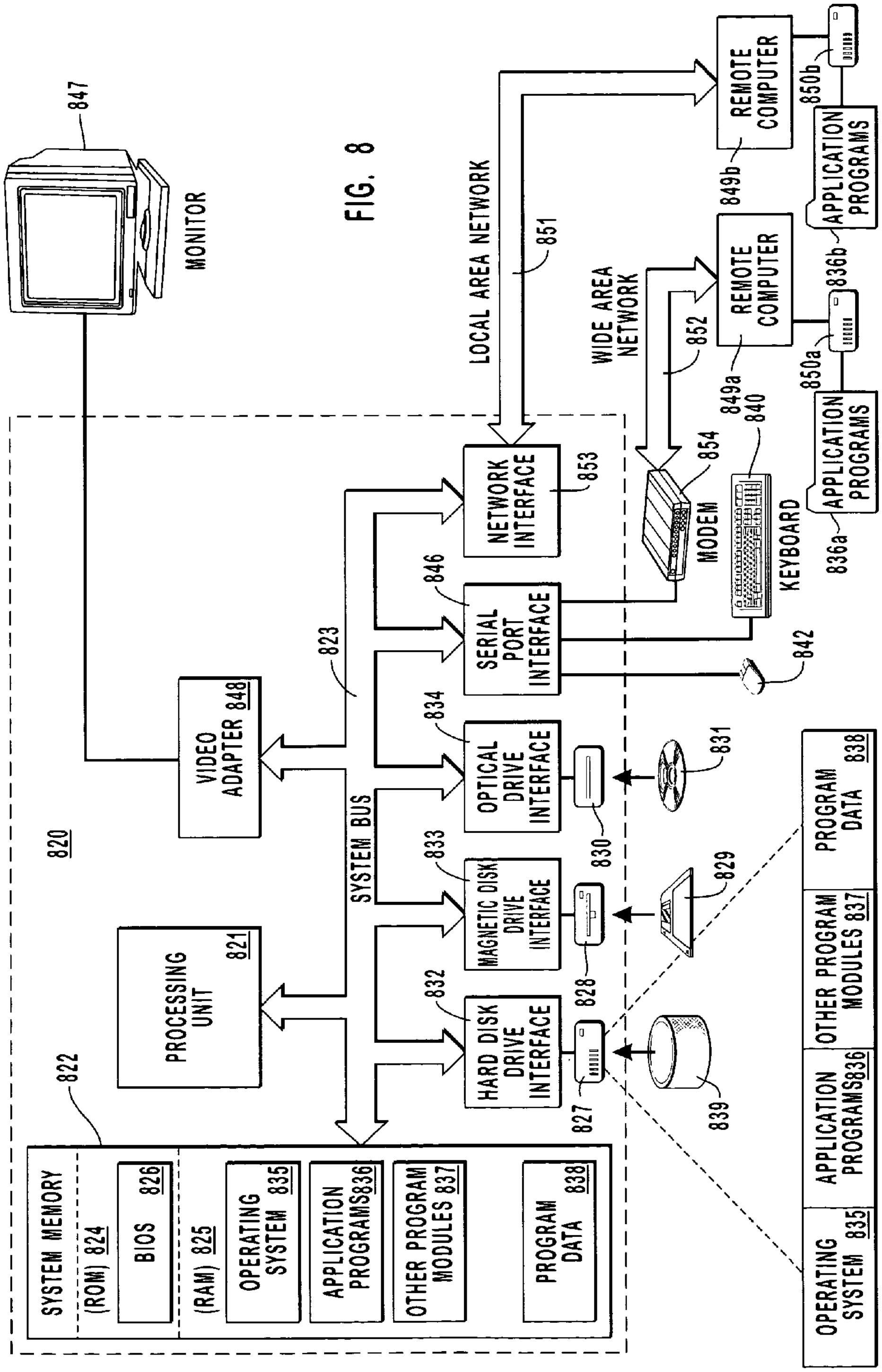
FIG. 8 illustrates an example system that provides a suitable operating environment for the present invention.

FIG. 8 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communication network. In a distributed computing environment, program modules may be located in both local and remote memory storage devices.

With reference to FIG. 8, an exemplary system for implementing the invention includes a general-purpose computing device in the form of a conventional computer 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disc drive 830 for reading from or writing to removable optical disc 831 such as a CD ROM or other optical media. The magnetic hard disk drive 827, magnetic disk drive 828, and optical disc drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disc 831, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 839, magnetic disk 829, optical disc 831, ROM 824 or RAM 825, including an operating system 835, one or more application programs 836, other program modules 837, and program data 838. A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849*a* and 849*b*. Remote computers 849*a* and 849*b* may each be another personal computer, a server, a router, a network PC, a peer device or other common network node, and typically include many or all of the elements described above relative to the computer 820, although only memory storage devices 850*a* and 850*b* and their associated application programs 836*a* and 836*b* have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet.

When used in a LAN networking environment, the computer 820 is connected to the local network 851 through a network interface or adapter 853. When used in a WAN networking environment, the computer 820 may include a modem 854, a wireless link, or other means for establishing communication over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communication over wide area network 852 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computer system that supports real time communication between a user of the computer system and one or more contacts, a method of making one or more user interfaces for real time communication less intrusive by automatically adjusting the one or more user interfaces based on the user's level of interaction over a period of time, the method comprising acts of:

displaying an intermediate representation of a user interface for real time communication, the intermediate representation including a text input box, a conversation window and at least a portion of a received real time message;

monitoring all types of user interaction with the intermediate representation of the user interface over a period of time;

determining an overall level of user interaction with the intermediate representation of the user interface based on a combination of all monitored user interactions with the user interface within the period of time;

determining the location and size of any other application windows that are being displayed in addition to the intermediate representation;

automatically adapting the user interface to the user's activity level by performing at least one of:

based on the determined overall level of user interaction, and without any explicit user input indicating that the intermediate representation is to be enlarged, automatically enlarging the size of the intermediate representation of the user interface to an enlarged representation appropriate for a high determined overall level of interaction, wherein the intermediate representation is enlarged without obstructing other windows in accordance with the determined location of the other windows, wherein the enlarged representation includes the text input box; and based on the determined overall level of user interaction, and without any explicit user input indicating that the intermediate representation is to be reduced, automatically reducing the size of the intermediate representation of the user interface to a reduced representation appropriate for a low determined overall level of interaction;

determining that the overall level of user interaction is sufficient to expand and separate the conversation window of the intermediate representation from the intermediate representation itself, such that the conversation window appears as a separate interface;

expanding the conversation window beyond the window borders of the intermediate representation, such that the conversation window's borders extend at least one of horizontally and vertically beyond the window borders of the intermediate representation; and separating the conversation window from the intermediate representation, such that the conversation window appears as a separate interface in addition to the intermediate representation of the user interface.

2. The method of claim 1, wherein the enlarged representation corresponds to a maximized state for the user interface, and wherein the intermediate representation of the user interface corresponds to a minimized state for the user interface.

3. The method of claim 1, further comprising an act of, upon automatically reducing the intermediate representation to a reduced representation, displaying a message to indicate where the reduced representation is located.

4. The method of claim 1, wherein the increased level of interaction comprises one or more of hovering over the intermediate representation and clicking a pointing device on the intermediate representation.

5. The method of claim 1, wherein the increased level of interaction comprises typing text in the text input box, and wherein the enlarge representation comprises a send option, the method further comprising an act of automatically reducing the enlarged representation to the intermediate representation upon selection of the send option.

6. The method of claim 1, wherein the intermediate representation of the user interface for real time communication is displayed within a desktop bar.

7. The method of claim 6, wherein the desktop bar also displays a contact representation, the method further comprising an act of, upon dragging and dropping a file object onto the contact representation, displaying a real time message window that includes the file object and an option to send the file object to a contact associated with the contact representation.

8. The method of claim 7, further comprising an act of highlighting the contact representation when one or more real time messages are received from the contact associated with the contact representation.

9. The method of claim 7, wherein the contact representation comprises a user definable icon.

10. The method of claim 6, wherein the desktop bar displays one or more representations of one or more other user interfaces simultaneously with the intermediate representation of the user interface for real time communication.

11. The method of claim 10, further comprising an act of automatically reducing or enlarging the one or more representations of the one or more other user interfaces when the intermediate representation is automatically enlarged or reduced.

12. The method of claim 11, wherein the one or more other user interfaces comprise one or more of a calendar object, a streaming video object, a streaming audio object, and a contact list.

13. The method of claim 1, wherein the reduced representation of the user interface for real time communication comprises a selectable icon.

14. The method of claim 13, wherein the intermediate representation of the user interface for real time communication is automatically reduced to the reduced representation, the method further comprising an act of displaying one or more received real time messages adjacent the reduced representation for at least a predetermined period of time.

15. In a computer system that supports real time communication between a user of the computer system and one or more contacts, a method of simplifying user interaction with one or more real time conmmnication user interfaces by adapting the one or more user interfaces to the user's activity level measured over a period of time, the method comprising steps for:

monitoring all types of user interaction with the intermediate representation of the user interface;

determining an overall level of user interaction with the intermediate representation of the user interface based on a combination of all monitored user interactions with the user interface within the period of time;

determining the location and size of any other application windows that are being displayed in addition to the intermediate representation;

determining, without any explicit user input indicating that the intermediate representation is to be adjusted, a size adjustment based on the determined level of user interaction with the initial representation of the user interface;

automatically applying the determined size adjustment to the initial representation of the user interface, such that the initial representation is adjusted without obstructing other windows in accordance with the determined location of the other windows;

determining that the overall level of user interaction is sufficient to expand and separate the conversation window of the intermediate representation from the intermediate representation itself, such that the conversation window appears as a separate interface;

expanding the conversation window beyond the window borders of the intermediate representation, such that the conversation window's borders extend at least one of horizontally and vertically beyond the window borders of the intermediate representation; and separating the conversation window from the intermediate representation, such that the conversation window appears as a separate interface in addition to the intermediate representation of the user interface.

16. The method of claim 15, wherein the step for automatically applying the determined size adjustment to the initial representation of the user interface based on the monitored level of user interaction occurs without an explicit input to reduce or enlarge the initial representation.

17. The method of claim 15, further comprising an act of displaying the initial representation of the user interface for real time communication in a desktop bar.

18. The method of claim 17, wherein the desktop bar also displays one or more representations of one or more other user interfaces.

19. The method of claim 18, further comprising a step for automatically adapting the one or more other user interfaces to account for one of more size changes in the initial representation of the user interface for real time communication.

20. For a computer system that supports real time communication between a user of the computer system and one or more contacts, a computer program product comprising one or more computer readable media carrying computer executable instruction that implement a method of making one or more user interfaces for real time communication less intrusive by automatically adjusting the one or more user interfaces based on the user's level of interaction over a period of time, the method comprising acts of:

displaying an intermediate representation of a user interface for real time communication, the intermediate representation including a text input box, a conversation window and at least a portion of a received real time message;

monitoring all types of user interaction with the intermediate representation of the user interface;

determining an overall level of user interaction with the intermediate representation of the user interface based on a combination of all monitored user interactions with the user interface within the period of time;

determining the location and size of any other application windows that are being displayed in addition to the intermediate representation;

automatically adapting the user interface to the user's activity level by performing at least one of:

based on the determined overall level of user interaction, and without any explicit user input indicating that the intermediate representation is to be enlarged, automatically enlarging the size of the intermediate representation of the user interface to an enlarged representation appropriate for a high determined overall level of interaction, wherein the intermediate representation is enlarged without obstructing other windows in accordance with the determined location of the other windows, wherein the enlarged representation includes the text input box; and based on the determined overall level of user interaction, and without any explicit user input indicating that the intermediate representation is to be reduced, automatically reducing the size of the intermediate representation of the user interface to a reduced representation appropriate for a low determined overall level of interaction;

determining that the overall level of user interaction is sufficient to expand and separate the conversation window of the intermediate representation from the intermediate representation itself, such that the conversation window appears as a separate interface expanding the conversation window beyond the window borders of the intermediate representation, such that the conversation window's borders extend at least one of horizontally and vertically beyond the window borders of the intermediate representation and separating the conversation window from the intermediate representation, such that the conversation window appears as a separate interface in addition to the intermediate representation of the user interface.

21. The computer program product of claim 20, wherein the act of automatically reducing the intermediate interface occurs without an explicit input to reduce the intermediate representation.

22. The computer program product of claim 20, wherein the intermediate representation of the user interface corresponds to a minimized state for the user interface.

23. The computer program product of claim 20, further comprising an act of, upon automatically reducing the intermediate representation to a reduced representation, displaying a message to indicate where the reduced representation is located.

24. The computer program product of claim 23, wherein the reduced representation of the user interface for real time communication comprises a selectable icon, the method further comprising an act of displaying one or more received real time messages adjacent the selectable icon for at least a predetermined period of time.

25. The computer program product of claim 24, the method further comprising an act of enlarging the selectable icon representation of the user interface for real time communication in response to the user interacting with the one or more real time message displayed adjacent to the selectable icon.

26. The computer program product of claim 20, wherein the intermediate representation of the user interface for real time communication is displayed within a desktop bar and wherein the desktop bar displays one or more representations of one or more other user interfaces simultaneously with the intermediate representation of the user interface for real time communication, the method further comprising an act of automatically reducing or enlarging the one or more representations of the one or more other user interfaces when the intermediate representation is automatically enlarged or reduced.

27. The computer program product of claim 26, wherein the one or more other user interfaces comprise one or more of a calendar object, a streaming video object, a streaming audio object, and a contact list.

28. For a computer system that supports real time communication between a user of the computer system and one or more contacts, a computer program product comprising one or more computer readable media carrying computer executable instructions that implement a method of simplifying user interaction with one or more real time communication user interfaces by adapting the one or more user interfaces to the user's activity level over a period of time, the method comprising steps for:

monitoring all types of user interaction with the intermediate representation of the user interface;

determining an overall level of user interaction with the intermediate representation of the user interface based on a combination of all monitored user interactions with the user interface within the period of time;

determining the location and size of any other application windows that are being displayed in addition to the intermediate representation;

determining, without any explicit user input indicating that the intermediate representation is to be adjusted, a size adjustment based on the determined level of user interaction with the initial representation of the user interface;

automatically applying the determined size adjustment to the initial representation of the user interface, such that the initial representation is adjusted without obstructing other windows in accordance with the determined location of the other windows;

determining that the overall level of user interaction is sufficient to expand and separate the conversation window of the intermediate representation from the intermediate representation itself, such that the conversation window appears as a separate interface;

expanding the conversation window beyond the window borders of the intermediate representation, such that the conversation window's borders extend at least one of horizontally and vertically beyond the window borders of the intermediate representation; and separating the conversation window from the intermediate representation, such that the conversation window appears as a separate interface in addition to the intermediate representation of the user interface.

29. The computer program product of claim 28, the method further comprising an act of displaying the initial representation of the user interface.

30. The computer program product of claim 28, wherein the step for automatically applying the determined size adjustment to the initial representation of the user interface based on the monitored level of user interaction occurs without an explicit input to reduce or enlarge the initial representation.

31. The computer program product of claim 28, further comprising an act of displaying the initial representation of the user interface for real time communication in a desktop bar that also displays one or more representations of one or more other user interfaces.

32. The computer program product of claim 31, further comprising a step for automatically adapting the one or more other user interfaces to account for changes in the initial representation of the user interface for real time communication.

33. The method of claim 15, further comprising automatically adjusting subsequent representations of the user interface according to a periodic interval.

34. The method of claim 15, wherein automatically applying the determined size adjustment to the initial representation of the user interface comprises enlarging at least a portion of the representation of the user interface.

35. The method of claim 15, wherein automatically applying the determined size adjustment to the initial representation of the user interface comprises reducing at least a portion of the representation of the user interface.

36. The method of claim 15, wherein automatically applying the determined size adjustment to the initial representation of the user interface comprises maintaining the current size of at least a portion of the representation of the user interface.

37. The method of claim 35, wherein the initial representation of the user interface comprises the text input box and a send option, and wherein reducing the initial representation of the user interface is in response to the user selecting the send option.

38. The method of claim 35, further comprising a step for indicating where the reduced representation may be found.

39. The method of claim 38, wherein the reduced representation comprises a conversation balloon.

40. The computer program product of claim 28, wherein the initial representation of the user interface comprises the text input box and a send option, and wherein reducing the initial presentation of the user interface is in response to the user selecting the send option.

41. The method of claim 1, wherein the monitored user interaction with the intermediate representation includes two or more of the following over the period of time: hovering over the intermediate representation with a pointing device, entering text using the intermediate representation, selecting an element in the intermediate representation with the pointing device, changing focus to the intermediate representation, dragging and dropping items within the intermediate representation, minimizing, maximizing, opening, closing, resizing and moving the intermediate representation.

42. The method of claim 1, further comprising the user adding at least a portion of a second, different user interface in place of the separated conversation window.

43. The method of claim 1, further comprising:

dragging and dropping a file onto a selected instant messaging user listed among instant messaging users in an instant messaging portion of the intermediate representation; and opening an instant messaging window that includes the selected user and the dragged and dropped file.

44. The method of claim 42, wherein the second, different user interface comprises a media player configured to provide video content.

45. The method of claim 1, wherein a second, different user interface is automatically inserted into the intermediate representation of the user interface in place of the separated conversation window.

46. The method of claim 45, wherein the second, different user interface comprises a calendar.

* * * * *